Figure 1:
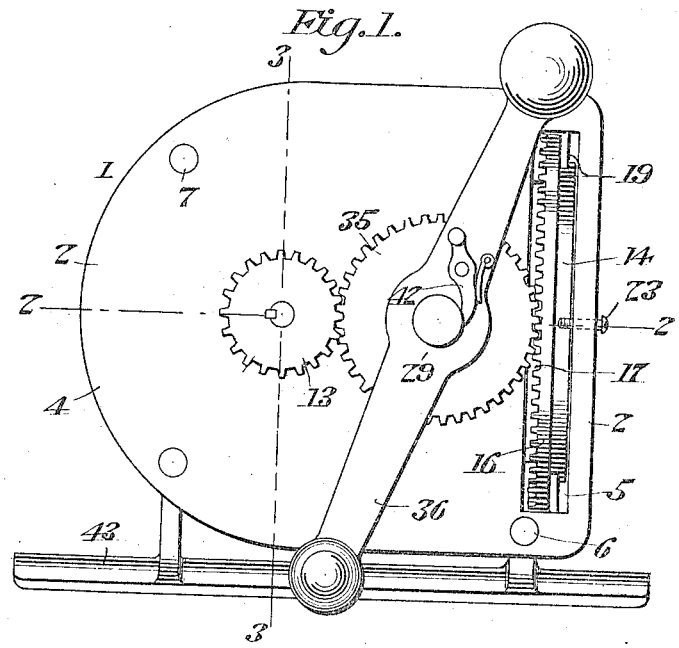

W. N. & R. L. CAVILEER.
FISHING REEL.
APPLICATION FILED MAY 12, 1916.

1,206,412.

Patented Nov. 28, 1916.
2 SHEETS—SHEET 1.

Witnesses

Inventors
William N. Cavileer &
Ruth L. Cavileer
By Victor J. Evans
Attorney

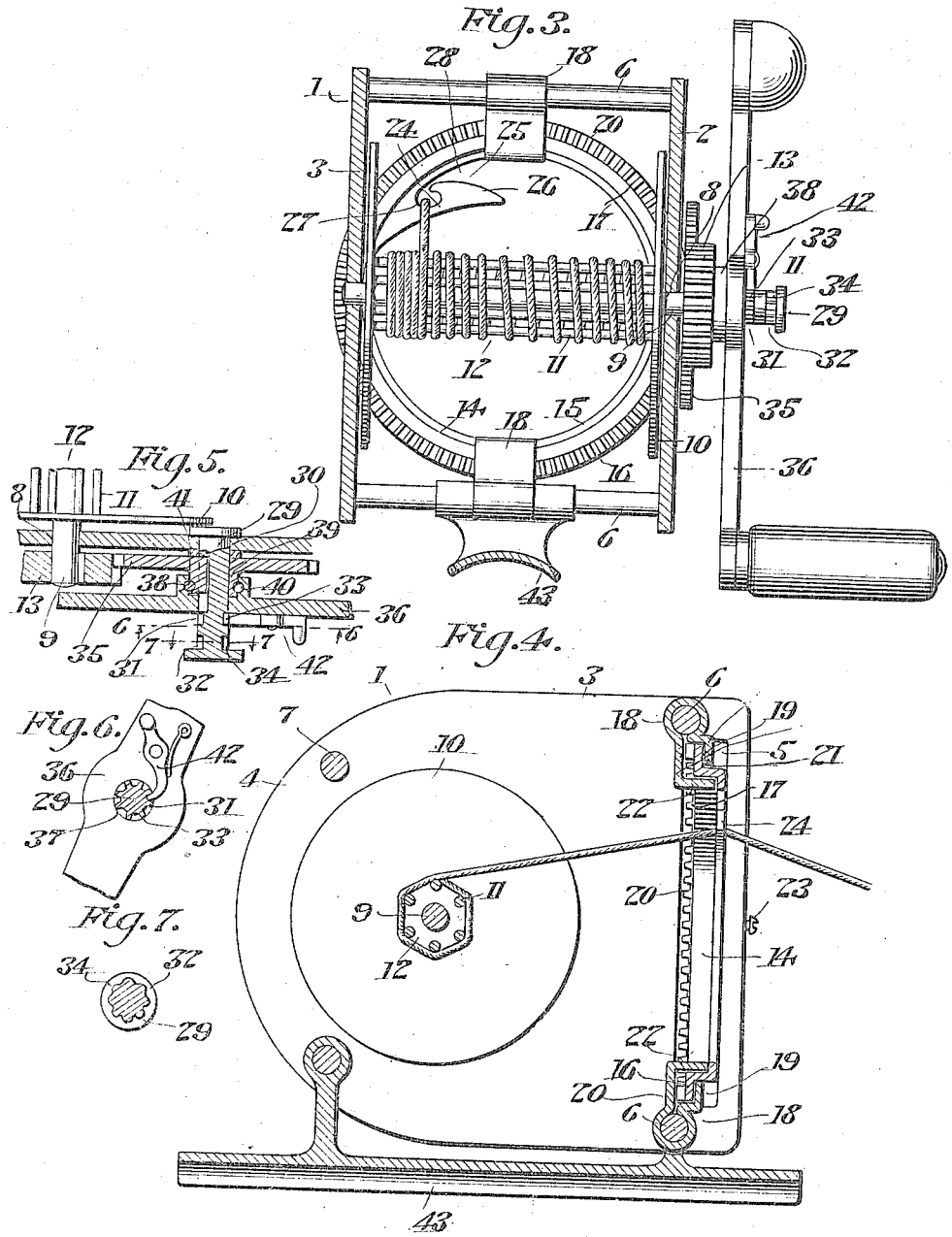

UNITED STATES PATENT OFFICE.

WILLIAM N. CAVILEER AND RUTH L. CAVILEER, OF PHOENIX, ARIZONA; SAID WILLIAM N. CAVILEER ASSIGNOR TO SAID RUTH L. CAVILEER.

FISHING-REEL.

1,206,412.   Specification of Letters Patent.   Patented Nov. 28, 1916.

Application filed May 12, 1916. Serial No. 97,162.

*To all whom it may concern:*

Be it known that we, WILLIAM N. CAVILEER and RUTH L. CAVILEER, citizens of the United States, residing at Phoenix, in the county of Maricopa and State of Arizona, have invented new and useful Improvements in Fishing-Reels, of which the following is a specification.

This invention relates to a reel and more particularly to that type of reel which may be used in connection with fishing poles and lines.

The primary object of the invention is to provide a fishing line reel having arranged in advance of the winding spool thereon a line distributing band, operatively connected with the mechanism for turning the winding spool which is so constructed that it is operable when the line is cast to prevent the line from becoming unwound from the reel too rapidly thus preventing what is commonly termed back-lashing.

Another object of the invention is to provide the reel with a line distributing band operable by means of the mechanism for operating the winding spool and having a line carrying hook which if the band is turned by said mechanism insures the line being carried backwardly and forwardly across the winding spool in an even manner.

A further object of the invention is to so mount the line distributing band upon the reel that when operated by the mechanism for turning the winding spool a line carrying hook on the band will space the windings of the line upon the winding spool a greater distance apart between the end of the spool, thus enabling the line to more quickly dry when wound upon the spool in a wet condition than is possible with lines now in common use.

A still further object of the invention is to provide the line distributing band with a line carrying hook which is so constructed that the line may be quickly and easily disengaged from the hook to enable the line to be wound upon the winding spool in the usual manner.

With these and other objects in view, the invention resides in the novel combination and arrangement of parts which will be hereinafter described and particularly pointed out in the claims.

The preferred embodiment of the invention has been illustrated in the accompanying drawing, although no restriction is necessarily made to the precise details of construction therein shown, as changes, alterations, and modifications within the scope of the claims may be resorted to when desired.

Figure 2:
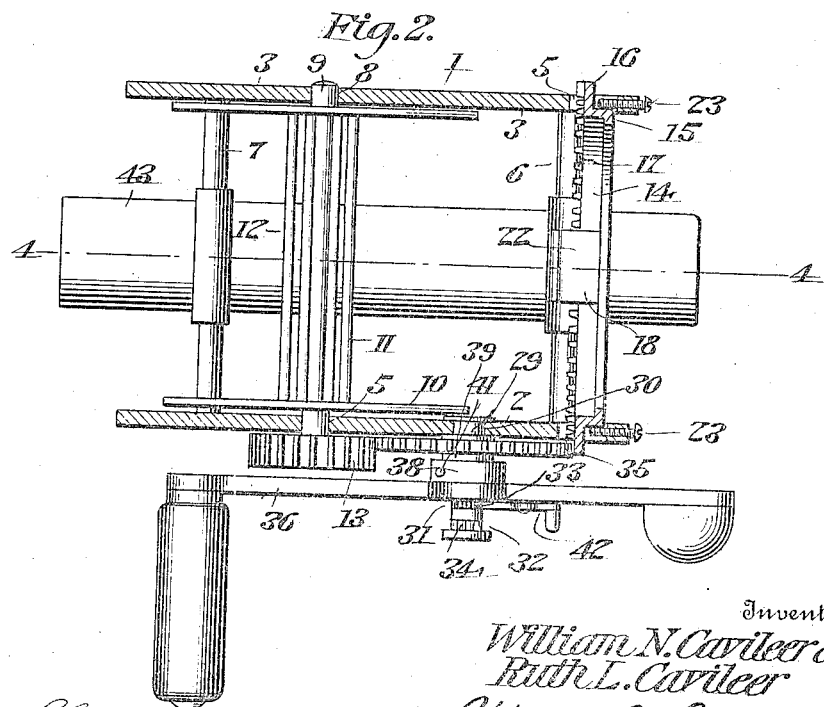

Like characters of reference denote corresponding parts throughout the several views in the drawing, in which:

Figure 1 is a side elevation of a fishing line reel constructed in accordance with the invention. Fig. 2 is a horizontal transverse sectional view on the line 2—2 of Fig. 1. Fig. 3 is a vertical transverse sectional view on the line 3—3 of Fig. 1. Fig. 4 is a longitudinal sectional view on the line 4—4 of Fig. 2. Fig. 5 is a detail sectional view through the mechanism for operating the winding spool and line distributing band. Fig. 6 is a section on the line 6—6 of Fig. 5. Fig. 7 is a section on the line 7—7 of Fig. 5.

Referring now to the drawing in detail, the numeral 1 designates the frame of the improved reel having spaced plates 2 and 3, each of which has a rounded end 4 and has formed therein adjacent its other end a transversely extending and elongated slot 5, said plates being connected by transversely extending bars 6 and 7 with the bars 6 arranged adjacent the respective ends of the slots 5 in the plates 2 and 3.

Each of the plates 2 and 3 has formed therein a centrally arranged bearing opening 8 in which is received for turning movement a trunnion 9 on a disk or head 10 arranged within the frame. Spaced bars 11 extend transversely between the disks or heads 10 and are connected therewith and arranged concentrically about the trunnions 9 in spaced relation with the peripheral wall of said disks or heads, said bars 11 coacting with the disks or heads in providing a winding spool 12. The trunnion 9 which is mounted in the bearing opening 8 in the plate 2 extends beyond the outer face of said plate for a short distance and has mounted thereon a toothed pinion 13.

A line distributing band 14 is interposed between the plates 2 and 3 in advance of the winding spool 12 and is provided upon one marginal edge with a continuous and inwardly extending annular flange 15 and upon its other marginal edge with an outwardly extending and continuous annular flange 16 extending through the slots 5 at diametrically opposite points, said flange 16 having formed thereon near its outer peripheral edge gear teeth 17.

Mounted upon each bar 6 is a clip 18 having spaced arms 19 and 20 between which are received the flange 16 on the line distributing band at diametrically opposite points. Each arm 19 has its free end curved, as at 21, to contact with the line distributing band, while the free end of each arm 20 is bent at right-angles, as at 22, to underlie the line distributing band beneath the portion thereof which is in contact with the curved portion 21 of the arm 19, so that said arms form bearings for supporting for turning movement the line distributing band 14.

Adjustably mounted in an end on each of the plates 2 and 3 is a screw 23, the shank of which extends within the slot 5 in the plate in which the screw is mounted to contact with the line distributing band 14 and bear against the flange 16 to prevent lateral movement of the line distributing band and undue strain being imposed on the arms of the clips 18.

The flange 15 has extending laterally from its inner peripheral edge a tapered extension 24 which is recessed forming a line carrying hook 25. The marginal edges of said extension are curved to provide the line carrying hook with a bill 26, said extension being recessed adjacent the flange 15 to provide a line receiving eye 27, so arranged with relation to the bill 23 that one marginal edge of the line carrying hook co-acts with the inner peripheral edge of the flange 15 in forming a mouth 28 by means of which the line may be guided into the line receiving eye 27 when the line distributing band is rotated in the manner presently described.

A stub shaft 29 has one end mounted for turning movement in an opening 30 in the plate 2, said shaft having formed therein near its other end spaced annular grooves 31 and 32, the groove 31 being provided with transversely extending teeth 33 while the groove 32 has extending transversely thereof spaced ribs or corrugations 34.

A gear wheel 35 is keyed to slide on the shaft 29 and to turn therewith, said gear wheel meshing with the pinion 13 on the winding spool and with the teeth 17 on the flange 16 of the line distributing band, so that when the shaft 29 is rotated turning movement will be imparted to the winding spool and line distributing band.

An operating handle 26 has formed therein between its ends an opening 37 through which passes the stub shaft 29, said handle having a collar 38 surrounding said opening and receiving a boss 39 on the gear wheel 35 which is provided with an annular groove 40 in which is received a portion of a pin 41 carried by the collar 38 and in this manner the operating handle is mounted to turn on said boss and connected with the gear wheel 35.

A spring pressed pawl 42 is pivotally connected with the handle 36 and has an end which when received in the groove 31 engages the teeth 33, so that the handle is locked to the shaft 29 and when turned will impart turning movement to the gear wheel 35 to cause the winding spool and line distributing band to rotate.

Through the above described manner of connecting the operating handle with the gear wheel 35, it will be seen that when the reel is in use and a strike is made, the winding spool will be free to turn without imparting turning movement to the handle 36.

When the handle 36 has been moved to a position on the stub shaft 29 in which an end on the pawl 41 will engage the ribs or corrugations 34, in the groove 32, the teeth on the gear wheel 35 are out of mesh with the teeth on the flange 15 and when the reel is in use and the line is cast, or a strike made the pawl will serve as a brake to retard the unwinding of the line from the winding spool, the line distributing band being free to turn in the bearings formed by the arms 19 and 20.

A pole piece 43 extends longitudinally of the frame 1 beyond the winding spool and the line distributing band and is connected with the bars 6 and 7 as shown when the reel frame has been secured to a pole in the usual manner with the line on the winding spool passing through the line distributing band and the pawl 42 engaged with the teeth in the groove 31 on the shaft 29, the operating handle 36 may be turned to rotate the winding spool and line distributing band, so that the bill of the line carrying hook will cause the line to be positioned in the line receiving eye 27 and as the band turns in the bearing arms 19 and 20, the line will be moved backwardly and forwardly across the winding spool and wound thereon in an even manner.

When the line has been wound on the winding spool as described above, the pawl may be disengaged from the teeth 23 and the handle slid to a position upon the shaft 29 in which the end of the pole will engage with the ribs or corrugations 34, so that when a cast or strike is made, the winding spool is free to turn without imparting turning movement to the line distributing band while the pawl and handle will serve as a brake to retard the un-winding of the line from the winding spool thus preventing too much line being played out or back-lashing.

With reference to Fig. 3 in the drawing, it will be seen that when the line is wound upon the winding spool, the movement of the line distributing band is relatively slow in comparison to the turning movement of the pinion 13, and that the windings of the line on the spool will be spaced a greater distance between the ends of the spool than adjacent the heads or disks 10, so that the air has a greater chance to come into the windings of the line and dry the same than would be possible with winding spools now in use.

It will also be noted that the bill 26 of the line carrying hook 25 is so arranged that if a strike is made when the gear wheel 35 is in engagement with the teeth 17 on the flange 15, the bill of the hook during the turning movement of the line distributing band will not engage the line and direct the same to the line receiving eye 27 and that this same result can be accomplished by manually removing the line from the line receiving eye 27.

From the foregoing description, taken in connection with the accompanying drawings, it will at once be apparent that a fishing reel has been provided which is simple in construction, yet highly efficient in use.

Having thus described the invention, what is claimed as new, is:

1. A fishing line reel comprising a frame, a winding spool carried by the frame, a line distributing band supported for turning movement on the frame in advance of the winding spool, and means for imparting turning movement to the winding spool and line distributing band.

2. A fishing line reel comprising a frame, a winding spool carried by the frame, a line distributing band mounted to turn within the frame and arranged in advance of the winding spool, means for operating the winding spool and line distributing band, and a line carrying hook on the line distributing band to engage with a line connected with the winding spool.

3. A fishing line reel comprising a frame, a winding spool carried by the frame, a line distributing band connected with the frame for turning movement, and means for operating the winding spool and line distributing band and a flange on said band having a tapered extension providing a line carrying hook.

4. A fishing line reel comprising a frame, a winding spool carried by the frame, bearing members connected with the frame, a flanged line distributing band supported for turning movement in said bearings, means for operating the winding spool and line distributing band, and a tapered extension on said band forming a hook and recessed to provide a line receiving eye.

5. A fishing line reel comprising a frame, a winding spool mounted to turn in the frame, a line distributing band mounted for turning movement within the frame in advance of the winding spool, a stub shaft mounted to turn in said frame, a gear wheel mounted to slide on said shaft and to impart turning movement to the winding spool and line distributing band, and means for operating said wheel and shaft.

6. A fishing line reel comprising a frame, a winding spool mounted to turn within the frame, a line distributing band mounted to turn within the frame in advance of the winding spool, a stub shaft mounted to turn in said frame, a gear wheel mounted to slide on said shaft and to impart turning movement to the winding spool and the line distributing band, a handle carried by said wheel, and means for locking said handle to the shaft.

7. A fishing line reel comprising a frame, a winding spool mounted to turn in said frame, a line distributing band mounted to turn within the frame in advance of the winding spool, a stub shaft mounted to turn in said frame and provided with spaced grooves, a gear wheel mounted to slide on said shaft and to impart turning movement to the winding spool and line distributing band, an operating handle mounted to turn on said wheel, and a pawl carried by said handle and having an end adapted to be received in said grooves.

In testimony whereof we affix our signatures.

WILLIAM N. CAVILEER.
RUTH L. CAVILEER.

Witnesses:
G. S. CUNNINGHAM,
HAROLD BAXTER.

Copies of this patent may be obtained for five cents each, by addressing the "Commissioner of Patents, Washington, D. C."